United States Patent [19]
Insolio

[11] 4,098,155
[45] Jul. 4, 1978

[54] SELF-COMPENSATING SCORING HEAD

[75] Inventor: Thomas A. Insolio, Bristol, Conn.

[73] Assignee: The Fletcher-Terry Company, Farmington, Conn.

[21] Appl. No.: 725,090

[22] Filed: Sep. 17, 1976

[51] Int. Cl.$^2$ .............................................. B26D 3/08
[52] U.S. Cl. ............................................ 83/8; 83/10; 83/11; 83/12; 83/485; 83/564; 83/582; 83/590; 83/614
[58] Field of Search .................. 83/8, 11, 10, 12, 582, 83/564, 485-487, 614, 588, 590; 225/2-4, 96, 96.5

[56] References Cited
U.S. PATENT DOCUMENTS

| | | | |
|---|---|---|---|
| 2,620,993 | 12/1952 | Jeffrey | 83/614 X |
| 3,198,044 | 8/1965 | Clin | 83/487 X |
| 3,280,677 | 10/1966 | Grzymislawski | 83/8 |
| 3,282,140 | 11/1966 | Sasabuchi et al. | 225/96.5 X |
| 3,459,078 | 8/1969 | Black | 83/8 |
| 3,905,261 | 9/1975 | Okuyama | 83/11 |

FOREIGN PATENT DOCUMENTS 2,003,127  7/1971  Fed. Rep. of Germany ......... 83/614

*Primary Examiner*—Frank T. Yost
*Attorney, Agent, or Firm*—McCormick, Paulding & Huber

[57] ABSTRACT

The head compensates for variations in flatness of a table upon which a glass sheet is placed for scoring, and also compensates for bending of the rails or support structure which carry the head as it traverses the table. A jump wheel is provided on a first arm pivotally mounted in the head, which head may comprise a trolley structure, and a scoring tool is mounted in a pivoted second arm having its pivot on the first arm. A spring acts between the first and second arms to bias the scoring tool to a limit position, defined by a suitable stop, such that the force of the scoring tool on the surface of the glass is independent of vertical displacement of the scoring tool as it traverses the sheet. The first arm is also spring biased to maintain contact between the jump wheel and the glass surface. The head can be used by itself on a suitable support or bridge structure for scoring the glass in one direction, or it can be mounted in a carriage for movement of several such heads in a direction longitudinally of the glass sheet.

2 Claims, 6 Drawing Figures

SELF-COMPENSATING SCORING HEAD

SUMMARY OF INVENTION

This invention relates generally to apparatus for scoring flat sheets of glass or the like while supported on a table which may not be perfectly flat, and deals more particularly with a self-compensating head for accommodating vertical motion of the glass scoring tool.

The principal object of the present invention is to provide a self-compensating head for a scoring tool such that the downward force exerted by the tool on the surface being scored does not vary as a result of unevenness of the work table, or variations in thickness of the glass, or as a result of deflection in the bridge or carriage structure in which the head is mounted.

In summary, apparatus of the present invention is adapted for use in scoring sheet material such as glass when laid on a table or the like. The apparatus includes bridge means extending across the table above the surface to be scored, which bridge means includes guide rails for movably supporting a trolley structure which is adapted to traverse the table. The trolley structure includes a jump wheel yieldably mounted in the trolley structure on a rocker arm such that the wheel rolls along the surface to be scored. Biasing means urges the jump wheel rocker arm downwardly to maintain contact between the wheel and the surface to be scored. A scoring tool is provided adjacent and to one side of the jump wheel and is also yieldably mounted in the trolley structure. More particularly, the scoring tool is mounted on a second rocker arm, itself pivotally mounted to the first arm, and biasing means is provided between the two arms to urge the scoring tool into contact with the surface being scored with a biasing force independent of any vertical motion of the jump wheel as the trolley traverses the table.

DETAILED DESCRIPTION

Figure 1:
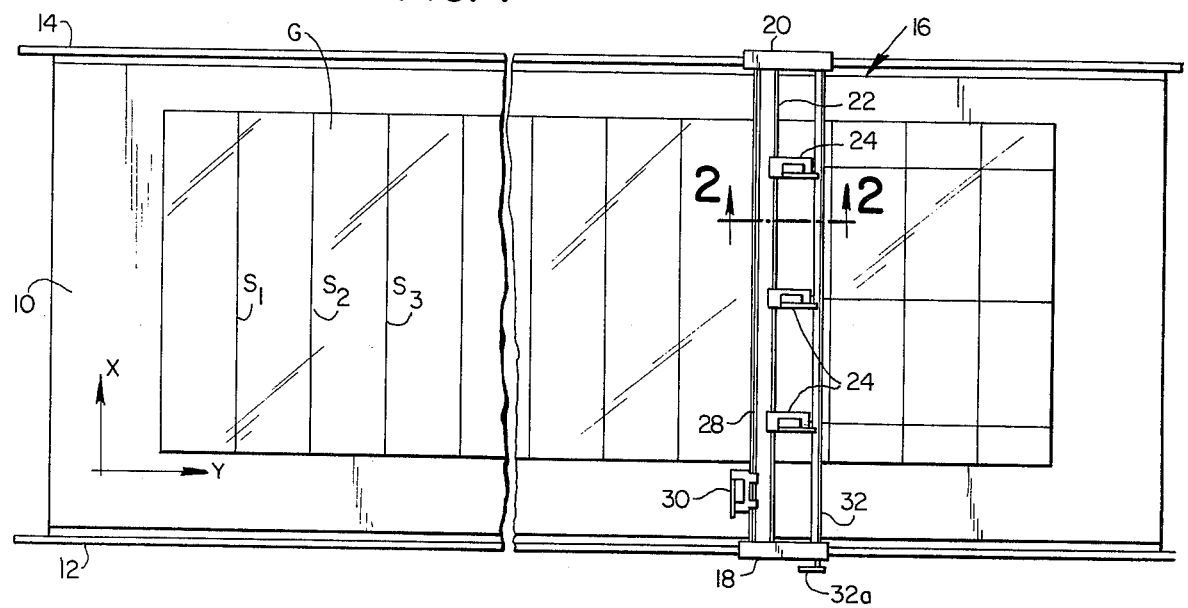
FIG. 1 is a plan view of a two dimensional glass scoring system incorporating the present invention.

Turning now to the drawings in greater detail, FIG. 1 shows a relatively large table 10 of rectangular configuration having the larger dimension in the Y direction and having an X direction as shown by the coordinates X and Y in this view. The self-compensating cutting head of the present invention is designed to apply a constant force, of the cutting wheel on the surface of the glass being scored, and has particular advantage when used in relatively large tables of the type shown in FIG. 1. With such a table, it is difficult, and often economically not feasible, to provide a perfectly flat planar upper surface for the table so that the upper surface of the sheet of glass to be scored will be truly flat and in a level plane. Thus, even if the support structure above the surface of the table, for movably supporting the cutting head, is itself fixed in space, variations in the downward force of the cutter against the glass will result. In the prior art structures with the cutter biased either pneumatically, electrically or by spring means, variations in this force will occur. The use of dead weight force has also been advocated in the prior art, but the inertia of the system causes vertical displacements of the cutting tool with respect to the glass surface being scored particularly during operation at higher speeds. Thus, the inertia of the system will cause unwanted accelerations which are reflected in increasing and decreasing forces applied to the glass by the scoring device.

Referring once again to the improved structure shown in FIG. 1, the cutting table 10 includes tracks 12 and 14 extending in the Y direction, alongside the marginal front and rear edges of the rectangular table shown. These tracks support a bridge structure, or means indicated generally at 16, said bridge means including front and rear end plates 18 and 20 having their lower edges mounted for sliding movement along the tracks 12 and 14 respectively. A cross beam 22, of generally channel shape best shown in FIG. 2, supports a plurality of X cutting heads 24, 24 adapted to score the sheet of glass G when the bridge 16 is moved from right to left as suggested in FIG. 1. The bridge can be moved manually, or might be driven in the negative Y direction by conventional means. As suggested in FIG. 1, the bridge 16 also includes one or more transversely extending guide rails 28 and a movable trolley structure 30 is provided on these guide rails for traversing the table in the X direction on the bridge 16.

In order to score the sheet of glass G, while it is supported on the table 10 in FIG. 1, one would first position the bridge structure 16 at the left hand side of the table and make the necessary cuts in the X direction. The Y cutting heads 24, 24 would be raised to their inactive positions by a lift bar 32, also provided in the bridge 16, which lift bar can be pivoted about an axis 34 best shown in FIG. 2 such that these Y axis cutting heads 24, 24 are raised to inactive positions in order that they not contact the surface of the glass G.

Figure 6:
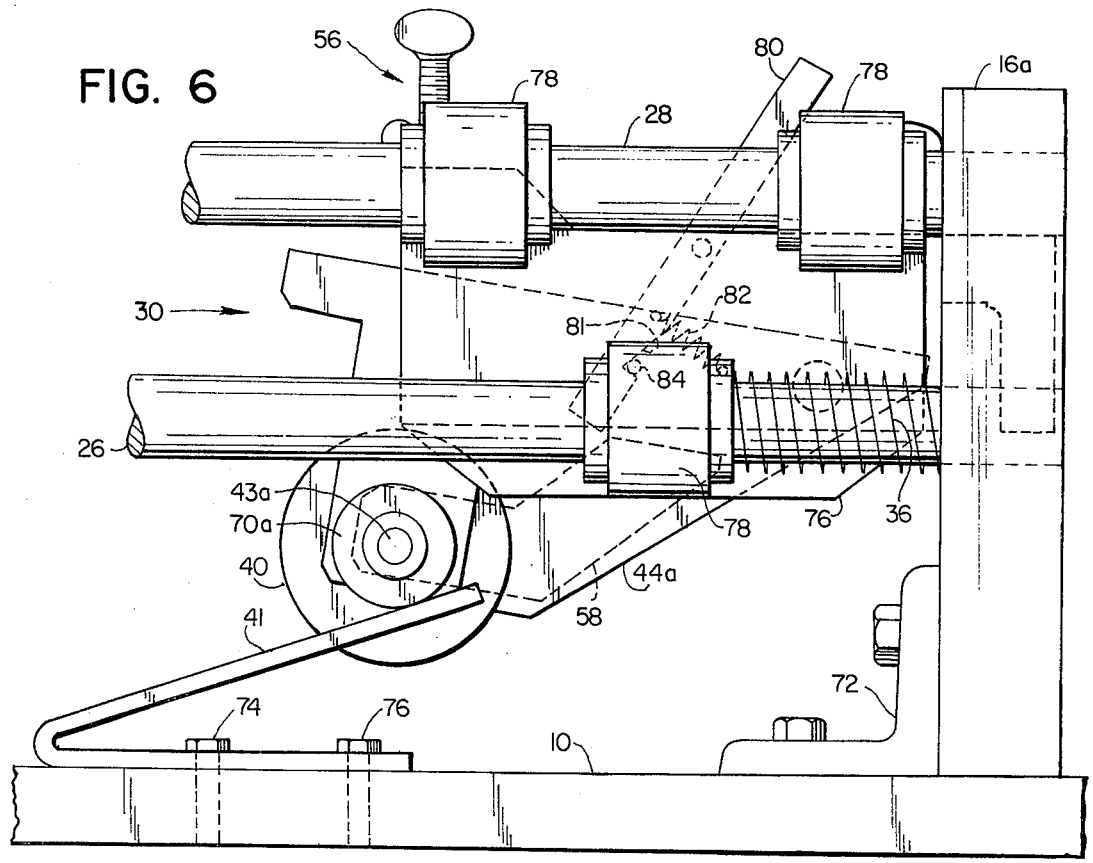
FIG. 6 is a side elevational view of the trolley structure illustrated in FIG. 5.

With the bridge structure 16 located at a particular station along the Y axis, the cutting head associated with the trolley structure 30, best shown in FIG. 6, can be manually operated by imparting a velocity to the trolley structure from the near side of the table 10 associated with the rail 12. The trolley structure 30 has sufficient inertia that it will move to the opposite side of the table, associated with the track or rail 14, causing the glass to be scored along the spaced score lines as suggested in FIG. 1 at S1, S2 and so forth. At the far side of the table 10, associated with the track 14, the trolley structure 30 compresses a spring (not shown in FIG. 1) which returns the trolley to the front of the table. The scoring tool is raised to its inactive position at the far side of the table by cam means, such as the ramp depicted in FIG. 6, with the result that the scoring tool retracts and the trolley returns to its initial position at the front side of the table associated with the track 12 where the operator can manually restrain the trolley and lower the tool in order to move the bridge 16 to a position suitable for making the next score in the X direction.

It will be apparent that this manual mode of operation is suitable for some applications, but that an automated mode of operation could easily be devised wherein the trolley structure 30 is driven in the X direction by conventional means. The trolley structure shown in FIG. 6 is adapted for use in a fixed bridge structure wherein all scores are made in the X direction. Referring now to FIG. 6 in greater detail, a lift ramp 40 is provided for engaging a cam roller 42 associated with the trolley structure 30 such that the cutting head is raised to its inactive position as it reaches the opposite or far side of the table 10. The lift ramp or cam 40 is mounted to the table in FIG. 6 and it will be apparent that the operator will have to shift the sheet of glass G beneath the fixed bridge structure indicated generally at 16a to utilize a device of this type. It will also be apparent that the lift ramp or cam 40 might instead be provided on the bridge 16 of FIG. 1 in the version there shown wherein the bridge 16 is adapted for movement in the Y direction. However, the FIG. 6 trolley structure is otherwise similar to that shown in FIG. 1 and it is only the location of the lift ramp or cam 40 either on the table or on the movable bridge 16 of FIG. 1 which distinguishes these two embodiments.

The table and bridge structure associated with the cutting heads of the present invention may, therefore, comprise a conventional system, all of the features for the table being such that a prior art cutting head should be utilized to accomplish the results described above. A typical prior art cutting head usually comprises a pillar post mounted in a rocker arm with a spring provided to urge the rocker arm downwardly and to cause the cutting wheel in the lower end of the pillar post to engage the glass surface for scoring purposes. Such a rocker arm is adapted to be pivoted upwardly by cam means in order to raise the scoring tool to inactive position. However, the scoring tool of such a prior art structure moves vertically in the process of scoring the glass sheet, due either to undulations in the glass, usually caused by corresponding undulations in the table, or to bending of the bridge structure in which the cutting head is mounted. This motion causes variations in the downward force of the scoring tool on the glass surface because of the fact that the spring force which urges the rocker arm downwardly will vary with these two parameters, and since the force of the spring is directly proportional to its length at any instant of time the downward force of the scoring tool on the glass will vary correspondingly. The present invention seeks to maintain this applied force at a constant rate in order to improve the characteristics of the score line in a glass cutting cable of the type described above.

Figure 2:
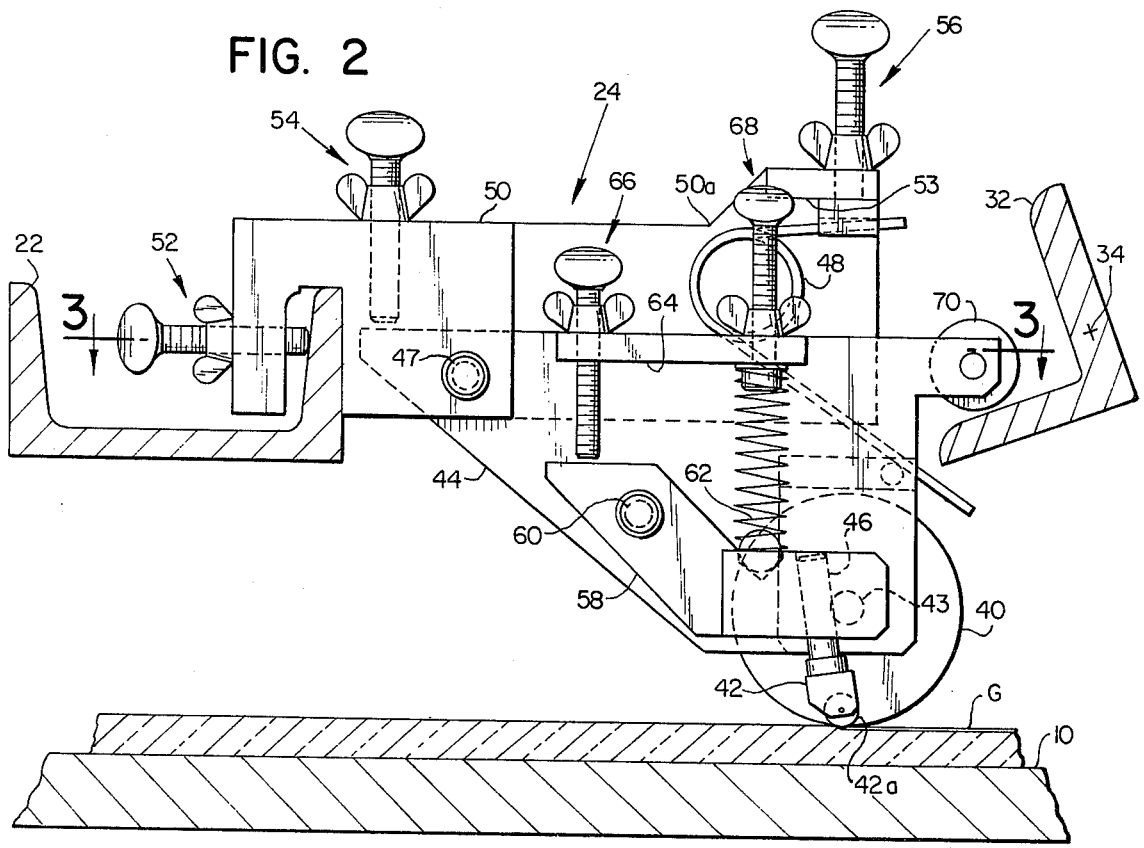
FIG. 2 is a vertical sectional view taken generally on the line 2—2 of FIG. 1 and illustrates to a somewhat larger scale, the details of construction for one of the self-compensating heads used in the system of FIG. 1 for scoring the rectangular glass sheet longitudinally.
Figure 4:
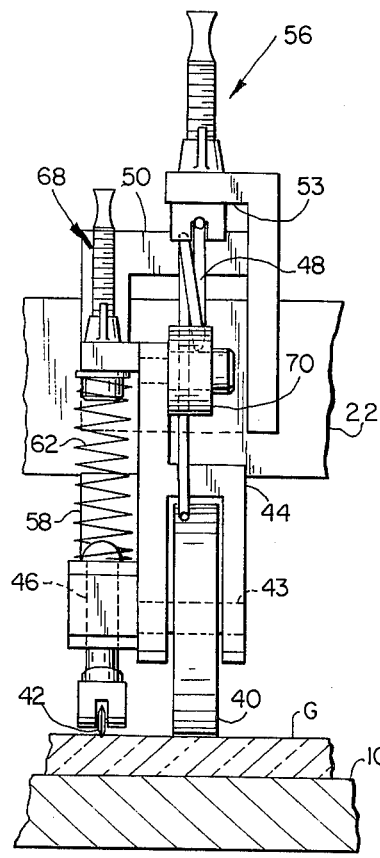
FIG. 4 is an elevational view of the self-compensating head illustrated in FIG. 2.
Figure 5:
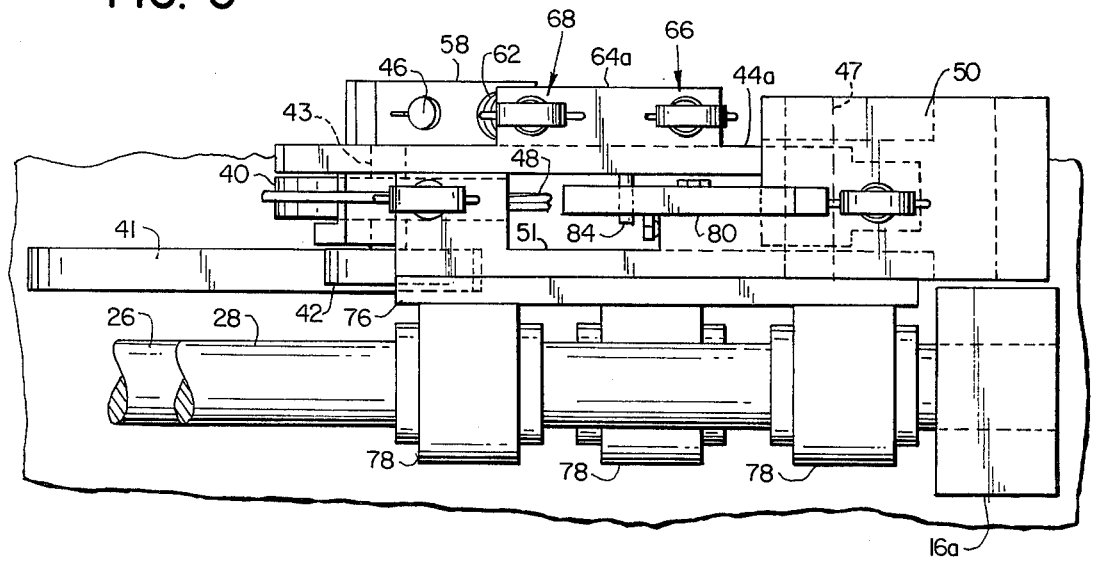
FIG. 5 is a plan view of the trolley structure and associated self-compensating head illustrated in FIG. 1 for making the score lines along the shorter dimension of the generally rectangular glass sheet, but with a modified support structure of the type adapted for use in scoring the sheet in only one direction.

Turning now to a detailed description of the self-compensating cutting head 24 of FIG. 2, it is noted that this head is generally similar to that shown in FIGS. 5 and 6 except for the fact that the cutting head of FIGS. 5 and 6 is mounted in a trolley structure for sliding movement along the guide rails 26 and 28 as mentioned previously. The cutting head 24 of FIG. 2 includes a wheel 40, sometimes referred to as a jump wheel, which wheel is adapted to contact the upper surface of the glass G and to ride along this surface during the scoring operation. Such jump wheels have been used heretofore, but have previously been employed to minimize the shock when the scoring tool 42 initially engages the edge of the glass G just prior to the scoring operation. That is, the jump wheel 40 gets its name from the function it serves in order to cause the scoring tool 42 and more particularly, the cutting wheel itself 42a to assume the proper vertical position as it first engages the edge of the glass G.

Figure 3:
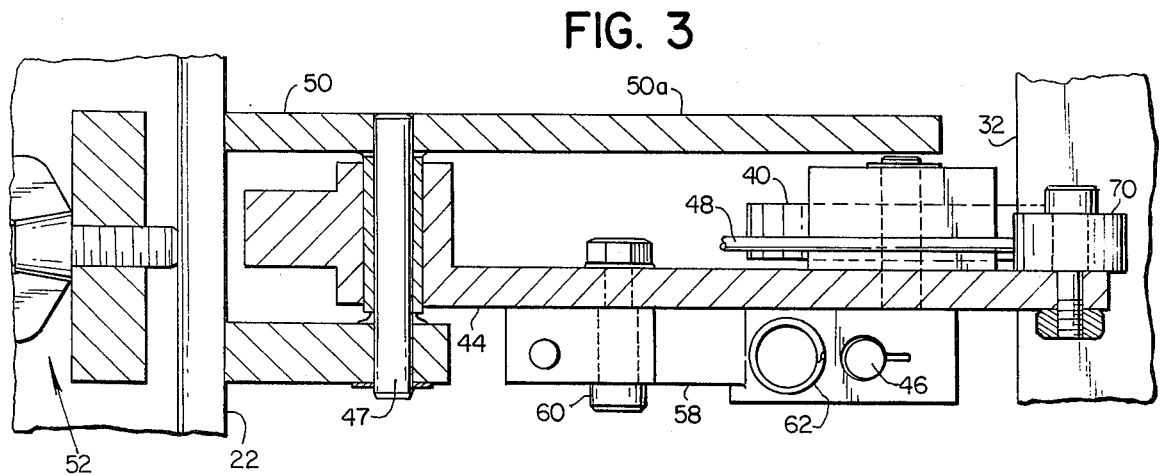
FIG. 3 is a horizontal sectional view taken generally on the line 3—3 of FIG. 2.

Means is provided for yieldably mounting the jump wheel 40 in the head 24 and preferably said means comprises a lever or rocker arm 44 pivotally mounted at one end on a pivot pin 47 and spring biased downwardly by the spring 48. The pin 47 is secured in a bifurcated structure 50 best shown in FIG. 3, said structure 50 being mounted to the channel shaped cross beam 22 described previously by suitable clamping means, as indicated generally at 52. The bifurcated structure 50 has one side which includes a portion 50a extending over the jump wheel 40 such that a projecting land is provided for one end of the spring 48 in order to provide a reaction surface for said one end of this spring. The opposite end of the spring 48 engages a pin on the rocker arm 44 to urge the jump wheel 40 into contact with the surface of the glass G during the scoring operation. Stop means is provided for limiting the downward position of the jump wheel 40 at the urging of said spring 48, and such stop means is indicated generally at 54. Means may be provided for adjusting the force of the spring 48 on the jump wheel rocker arm 44 and said means is indicated generally at 56 in FIG. 2.

The pillar post 42 is mounted adjacent and to one side of the jump wheel 40 so that the glass scoring tool, or cutting wheel 42a, contacts the surface of the glass G at a point closely spaced to that of the contact between the wheel 40 and the glass surface. Means is provided for yieldably mounting the scoring tool to the jump wheel rocker arm 44 and preferably said means comprises a second lever or rocker arm 58. This second rocker arm 58 is pivotally mounted to the first rocker arm by pivot pin 60 and the pillar post 42 has a stem portion 46 removably received in a suitable opening provided for this purpose in the free end of the second rocker arm 58. Means is provided for biasing the second arm 58 and consequently, the scoring tool itself downwardly toward the surface of the sheet to be scored, and it is an important feature of the present inventon that because of the geometry of the above-described system this force remains independent of any vertical motion of the jump wheel as the head traverses the table in the X and Y directions as suggested in FIG. 1. Preferably, the biasing means 62 acts between a land 64, defined for this purpose on the first rocker arm 44 associated with the jump wheel 40, and the other end of the spring 62 acts against the second rocker arm 58 associated with the scoring tool as shown. Stop means 66 is provided for limiting the down position of the scoring tool and preferably said stop means is also provided in the land 64 and acts against an end of the second rocker arm 58 as shown in FIG. 2. Means is provided for adjusting the downward force of the spring 62 on the second rocker arm 58, and is indicated generally at 68 in FIG. 2. Thus, the upper end of the spring 62 is adapted to engage the land 64 and the lower end engages the arm 58.

Still with reference to FIG. 2 a cam follower roll 70 is provided on the upper free end portion of the first rocker arm 44 associated with the jump wheel 40 and is adapted to be engaged by the lift bar 32 described above in order to pivot the first arm 44 from the position shown in FIG. 2 to a raised or inactive position such that the bridge 16 can traverse the table in the Y direction without scoring. This lift bar 32 is adapted to be manually pivoted and held in the raised position by a crank 32a best shown at the near side of the table in FIG. 1. Locking means may be provided for holding the handle 32a in the raised position in order to facilitate positioning the bridge 16 for purposes of making the cross cuts in the X direction by structure similar to that illustrated to best advantage in FIGS. 5 and 6. Actually, the trolley structure illustrated in FIGS. 5 and 6 relates to use of the cutting head 30 in a fixed bridge structure, that is in a bridge structure 16a wherein the end plates are secured to the table as shown generally at 72 in FIG. 6. In such a situation the lift ramp or cam 41 for raising the jump wheel and scoring tool is conveniently mounted directly to the table 10 as indicated generally by the fasteners 74 and 76. However, and as mentioned previously, the bridge 16 need not be permanently attached to the table but might instead be movably mounted on the tracks as indicated generally at 12 and 14 in FIG. 1. In such a case, the cam or lifting ramp 40 would be provided on the movable carriage structure 16 rather than being fastened directly to the table as shown in FIG. 6. However, FIG. 6 illustrates a trolley structure suitable for mounting the jump wheel and scoring tool in a manner so as to take advantage of the present invention whether the bridge structure 16 is movable as shown in FIG. 1 or fixed to the table as shown in FIG. 6.

Referring now to the trolley structure of FIGS. 5 and 6 in greater detail, said structure is adapted to be mounted on the guide rails 26 and 28 comprising part of the bridge 16, or the fixed structure 16a, and these rails are provided parallel to the channel 22 mentioned previously with reference to FIG. 2. The channel and associated structure have been omitted from FIGS. 5 and 6 because in the fixed bridge structure 16a the channel is not required. The various parts of the trolley structure illustrated in FIGS. 5 and 6 which are similar to those of the self-compensating head 24 illustrated in FIG. 2 are designated by similar reference numerals. Considering first the plan view of FIG. 5, the trolley structure includes a mounting plate 76 having three slide bearings 78, 78 attached to one side thereof, and a member 51 attached to the opposite side of the plate 76. The member 51 may be generally similar to the member 50 but need not have an end portion for attachment to the channel 22. However, the member 51 does have a bifurcated portion for receiving the pivoted end of the lever, or rocker arm 44a. This arm 44a is similar to the arm 44 described previously except for the elimination of the roller 70 at its free end. Thus, the arm 44a rotatably supports a jump wheel 40 on a shaft 43a. A roller 70a is also provided on this shaft 43a, but might be provided anywhere on arm 44a to retract the jump wheel and scoring tool. In FIG. 6, this roller 70a cooperates with a fixed cam or ramp 41 to lift the arm 44a at the end of the trolley stroke so that the trolley can be returned by spring 36 to the front side of the table 10.

The scoring tool, in the form or a pillar post 42 and scoring wheel 42a, is provided on a second rocker arm 58 indentical to the arm 58 in FIG. 2. Pivot pin 60 supports the arm 58 for pivotal movement on the arm 44a, and a spring 62 acts between a land 64a on arm 44a and this arm 58 to urge the scoring tool into contact with the glass G with a force which is constant as long as the wheel 40 remains in contact with the glass G as described above. The stop screw, 54 and 66, associated with arms 44a and 58 respectively, are identical, as are the adjustment screws 56 and 68, with those of FIG. 2. Thus, the head portion of the trolley structure mounted to plate 76 is substantially identical to the head of FIG. 2. The differences relate to the means for raising the jump wheel arm and holding it in an inactive position. In FIG. 2, the arm 44 is raised and held by the lift bar 32 acting on roller 70. In FIGS. 5 and 6, the arm 44a is raised by the cam 41 acting on the roller 70a described above. A latch 80 is provided to hold the head in its inactive position. The latch 80 has a notch 81 adapted to receive a pin 84 held in the member 50a as the head reaches its limit of travel toward the right in FIG. 6. The latch 80 can be conveniently operated to release the pin 84 when the trolley has returned to the front of the table, to lower the scoring tool and jump wheel preparatory to making another score line as suggested in FIG. 1. A spring 82 biases the latch 80 toward the latched position shown in FIG. 6. Simply pushing the upper end of the latch 80 to overcome the spring force will allow the head to be lowered to its active position for the scoring operation described above. As the head reaches the opposite side of the table during the actual scoring, ramp 41 raises the head and latch 80 holds it in the raised position shown in FIG. 6 so that the return spring 36 can return the head to the front side of the table.

It should perhaps be noted that the term jump wheel has been adopted herein to describe the unique wheel disclosed, wherein said wheel contacts the glass continually during the scoring operation. Prior art jump wheels do not contact the glass during the scoring operation, but only do so momentarily as the wheel contacts the edge of the glass. Thus a prior art jump wheel serves only this preliminary guiding function, and in no way shows or suggests the sensing function disclosed herein whereby it bears on the glass during the scoring operation and follows any undulations in the glass surface being scored.

Still with reference to the so called jump wheel 40 of the FIG. 6 version an improvement not shown in the drawing for this single axis embodiment involves the provision of a one way clutch in the hub of the jump wheel 40 to provide for rotation in the scoring direction only. The use of such a clutch effectively prevents full return of the cutting head if arm 44a fails to latch up as described previously.

I claim:

1. Apparatus for scoring sheet material laid on a table, said apparatus comprising bridge means extending across the table above the sheet surface to be scored and including guide rail means, a trolley structure movably mounted on said guide rail means and adapted to traverse the table, a jump wheel, first lever means pivotally mounting said jump wheel in said trolley structure so that said wheel rolls along the sheet surface to be scored, first biasing means urging said wheel toward the sheet surface, a scoring tool adjacent said jump wheel, second lever means pivotally mounting said scoring tool to said first lever means, second biasing means acting between said first and second lever means to urge said scoring tool downwardly toward said sheet surface with a force independent of pivotal motion of the jump wheel as the trolley traverses the table, a return spring located at one side of said bridge means to be compressed by movement of said trolley structure in one direction and to act upon said trolley structure to return it in an opposite or return direction, cam means for raising said first lever means at said one side, and latch means on said trolley structure for holding said first lever means in an inactive or raised position for return movement thereof.

2. Apparatus for scoring sheet material laid on a table, said apparatus comprising bridge means extending across the table above the sheet surface to be scored and including guide rail means, a trolley structure movably mounted on said guide rail means and adapted to traverse the table, a jump wheel, first lever means pivotally mounting said jump wheel in said trolley structure so that said wheel rolls along the sheet surface to be scored, first biasing means urging said wheel toward the sheet surface, a scoring tool adjacent said jump wheel, second lever means pivotally mounting said scoring tool to said first lever means, second biasing means acting between said first and second lever means to urge said scoring tool downwardly toward said sheet surface with a force independent of pivotal motion of the jump wheel as the trolley traverses the table, fixed tracks along both sides of the table, means movably supporting said bridge means at one and an opposite end for translational movement thereof along said fixed tracks, a beam in said bridge means parallel said guide rail means, at least two scoring heads clamped to spaced locations on said beam, each such head including first and second lever means and associated jump wheel and scoring tool respectively, and an elongated lift bar for raising said first lever means, said lift bar also oriented parallel said beam and mounted for oscillation on a longitudinal axis for moving said heads to inactive positions.

* * * * *